United States Patent
Egri et al.

(10) Patent No.: US 8,270,513 B2
(45) Date of Patent: Sep. 18, 2012

(54) FULLY SATURATED MULTI-TONE TRANSCEIVER

(75) Inventors: Robert Egri, Wayland, MA (US);
Laurent Perraud, Acton, MA (US)

(73) Assignee: Cobham Defense Electronic Systems Corporation, Bolton, MA (US)

( * ) Notice: Subject to any disclaimer, the term of this patent is extended or adjusted under 35 U.S.C. 154(b) by 1038 days.

(21) Appl. No.: 11/753,225

(22) Filed: May 24, 2007

(65) Prior Publication Data
US 2007/0280372 A1    Dec. 6, 2007

Related U.S. Application Data

(60) Provisional application No. 60/809,901, filed on May 31, 2006.

(51) Int. Cl.
H04B 7/02       (2006.01)
H04L 27/00     (2006.01)

(52) U.S. Cl. ......................................... 375/267; 375/299
(58) Field of Classification Search .................. 375/267, 375/299, 347, 349; 700/53; 455/101, 132–141
See application file for complete search history.

(56) References Cited

U.S. PATENT DOCUMENTS

| | | | |
|---|---|---|---|
| 5,732,113 | A | 3/1998 | Schmidl et al. |
| 5,914,933 | A | 6/1999 | Cimini et al. |
| 6,130,918 | A | 10/2000 | Humphrey et al. |
| 6,392,588 | B1 | 5/2002 | Levanon |
| 6,882,619 | B1 | 4/2005 | Gerakoulis |
| 6,944,122 | B2 | 9/2005 | Shirakata et al. |
| 7,016,431 | B2 | 3/2006 | Schrader et al. |
| 7,151,476 | B2 | 12/2006 | Egri et al. |
| 7,184,492 | B2 * | 2/2007 | Dent ............................. 375/299 |
| 2002/0176510 | A1 | 11/2002 | Laroia |
| 2005/0013379 | A1 | 1/2005 | Duvaut et al. |
| 2005/0175116 | A1 | 8/2005 | Feher |
| 2006/0034389 | A1 * | 2/2006 | Aoki ............................. 375/299 |

(Continued)

OTHER PUBLICATIONS

Quachani I et al: "Trading rate versus diversity in space-time-frequency block coding schemes" Control, Communications and Signal Processing, 2004. First International Symposium on Hammamet, Tunisia Mar. 21-24, 2004, Piscataway, NJ, USA, IEEE, Mar. 21, 2004, pp. 171-174.

(Continued)

*Primary Examiner* — Khanh C Tran
(74) *Attorney, Agent, or Firm* — Jaeckle, Fleischmann & Mugel, LLP

(57) ABSTRACT

The present invention provides a method and system for transmitting a multi-frequency signal composed of discrete tones of constant envelope parts that are amplified by a bank of fully saturated transmitters operating in their most power efficient mode. After amplification and transmission, the signals are multiplexed in the air as opposed to multiplexing before amplification that allows for more efficient amplification as well. In a preferred embodiment, the system has two or more transmitting antennas, and the method comprises: (a) generating a first signal of a first carrier frequency and a second signal of a second carrier frequency; (b) transmitting the first signal of a first carrier frequency on a first antenna and the first signal of a second carrier signal on a second antenna for a predetermined time period; and (c) transmitting a second signal of the second carrier frequency on said first antenna and a second signal of the first carrier frequency on the second antenna for the predetermined time period. Preferably, the signals are transmitted using an amplifier that is essentially fully saturated.

16 Claims, 2 Drawing Sheets

U.S. PATENT DOCUMENTS

| | | | | |
|---|---|---|---|---|
| 2006/0146952 | A1* | 7/2006 | Magee | 375/267 |
| 2006/0222141 | A1* | 10/2006 | Hoover et al. | 377/27 |
| 2007/0032266 | A1* | 2/2007 | Feher | 455/553.1 |
| 2007/0058586 | A1* | 3/2007 | Ode et al. | 370/331 |
| 2007/0092020 | A1* | 4/2007 | Seki | 375/267 |
| 2007/0238483 | A1* | 10/2007 | Boireau et al. | 455/553.1 |

OTHER PUBLICATIONS

Cimini L J et al: "Clustered OFDM With Transmitter Diversity and Coding" Communications: The Key to Global Prosperity. GLOBECOM 1996. London, Nov. 18-22, 1986, Global Telecommunications Conference (GLOBECOM), New York, IEEE, US, vol. 1, Nov. 18, 1996, pp. 703-707.

Kaiser S Ed—Institute of Electrical and Electronics Engineers: "Spatial Transmit Diversity Techniques for Broadband OFDM Systems" GLOBECOM'00. 2000 IEEE Global Telecommunications Conference. San Francisco, CA, Nov. 27-Dec. 1, 2000, IEEE Global Telecommunications Conference, New York, NY: IEEE, US, vol. 3 of 3, Nov. 27, 2000, pp. 1824-1828.

International Search Report, International application No. PCT/US2007/012712, International filed May 30, 2007.

van Zelst, Allert, Student Member, IEEE; Schenk, Tim, C.W., Student Member, IEEE; Implementation of a MIMO OFDM-Based Wireless LAN System, Feb. 2004, IEEE Transactions on Signal Processing, vol. 52, No. 2, pp. 483-494.

Zhang, Zhan; Ilow, Jacek; Frequency Domain Equalization for MIMO Space-Time Transmissions with Single Carrier Signaling, The 14th IEEE 2003 International Symposium on Personal, Indoor and Mobile Radio Communication Proceedings, pp. 2262-2266.

* cited by examiner

FULLY SATURATED MULTI-TONE TRANSCEIVER

FIELD OF THE INVENTION

The present invention is directed towards wireless communications, more specifically to multi-tone wireless communications.

BACKGROUND OF THE INVENTION

This application claims priority to U.S. Provisional Application No. 60/809,901, filed May 31, 2006, which is hereby fully incorporated by reference.

In recent years, one important area of research and development in wireless communications has been multiple-input multiple-output (MIMO) development. MIMO allows for multiple antennas to broadcast messages simultaneously, resulting in significant increases in throughput and range at a similar bandwidth and power expenditure as single-input single-output systems (SISO).

One concern with wireless communications is spatial diversity. Spatial diversity results when a message is obstructed by some external phenomena. For example, a mountain may be blocking a wireless transmission. In general, MIMO technology increases the spatial diversity of a wireless communication system by including multiple antennas. However, this spatial diversity comes at a price. MIMO communication systems generally function by sending out non-constant envelope signals. These signals require linear amplification which utilizes less efficient amplifiers that consume more power, generate more heat and are more expensive than other amplifier counterparts used in constant envelope signaling.

Additionally, by using non-constant envelope signaling, standard MIMO techniques do not address frequency diversity power efficiently. Frequency diversity results when a single message is broadcast over several frequencies simultaneously. By utilizing frequency diversity, the chances of a receiver receiving a non-distorted signal are increased.

Therefore, there is a need for a MIMO transmission approach that avoids low efficiency, below saturation amplification while providing frequency diversity via OFDM. The present invention fulfills this need among others.

SUMMARY OF THE INVENTION

One aspect of the invention is a method of transmitting a multi-tone signal decomposed into a plurality of constant envelope signals over a multiple input multiple output (MIMO) system. In this embodiment, the MIMO system has two or more transmitting antennas, and the method comprises: (a) generating first and second signals having different frequencies; (b) transmitting the first signal on a first antenna and the second signal on a second antenna for a predetermined time period; and (c) transmitting the second signal on the first antenna and the first signal on the second antenna for the predetermined time period. Preferably, the signals are transmitted using an amplifier that is essentially fully saturated.

In another embodiment, the method comprises (a) generating a plurality of signals having different frequencies; and (b) transmitting individually each of the signals on each of the antennas for a predetermined time period and in a predetermined sequence. Preferably, the signals are transmitted using an amplifier that is essentially fully saturated.

Another aspect of the invention is a system for transmitting a multi-tone signal decomposed into a plurality of constant envelope signals. In this embodiment, the system comprises an amplifier circuit comprising (a) a signal generator for generating tones of constant envelope signals; (b) an upconverter for converting said tones to a transmittable frequency band; (c) an amplifier for amplifying each converted tone for transmission by a separate antenna. Preferably, the bank of upconverter mixers and amplifier circuit is integrated on a chip. The transmitter is preferably a single CMOS or BiCMOS integrated circuit chip, although other semiconductor technologies are possible. Preferably, the amplifier circuit also comprises a matching circuit to tune each tone to its antenna. In one embodiment, the amplifier circuit also comprises the antennas.

DETAILED DESCRIPTION OF INVENTION

The present invention provides a method and system for transmitting a multi-frequency signal composed of discrete tones of constant envelope parts that are amplified by a bank of fully saturated transmitters operating in their most power efficient mode. After amplification and transmission, the signals are multiplexed in the air as opposed to multiplexing before amplification, which allows for more efficient amplification as well. This concept is related to U.S. Pat. No. 7,151,476, hereby incorporated by reference. Therefore, the present invention provides a wireless transmitter that operates at high efficiency while transmitting a multi-tone signal.

As digital processing technology advances, the present invention will be more and more advantageous since both processing speed and power efficiency can still be improved, but are currently being held back by hardware technology. Furthermore, power efficiency of linear amplification, as is used in prior art MIMO techniques, is changing very slowly, if at all. The present invention overcomes the limitation of linear amplification by placing the burden of efficiency on the processing of the tones, and utilizing amplifiers in their theoretically most efficient mode.

Figure 1:
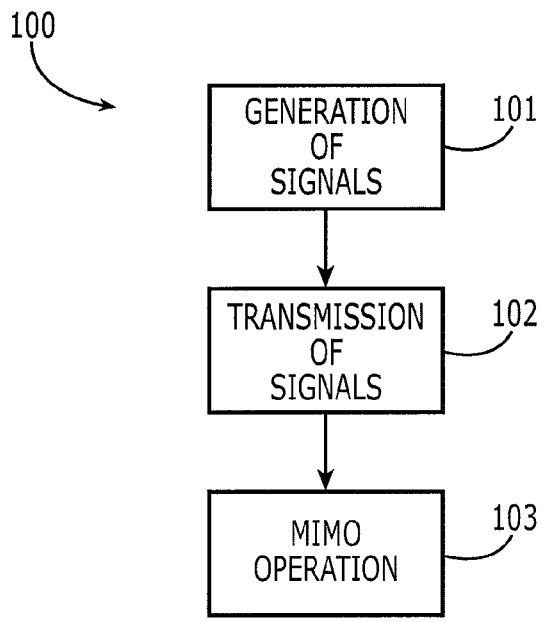
FIG. 1 is a flow chart illustrating one embodiment of the present invention.

Referring to FIG. 1, a flow chart 100 of a preferred embodiment of the method of the present invention is shown. The method relates generally to transmitting a multi-tone signal decomposed into a plurality of constant envelope signals over a multiple input multiple output (MIMO) system having two or more transmitting antennas. In step 101, first and second signals having different frequencies and the same payload are generated. For a predetermined time period, the first signal is transmitted on a first antenna and the second signal is transmitted on a second antenna in step 102. In step 103, the second signal is transmitted on the first antenna and the first signal is transmitted on the second antenna for the predetermined time period.

Figure 2:
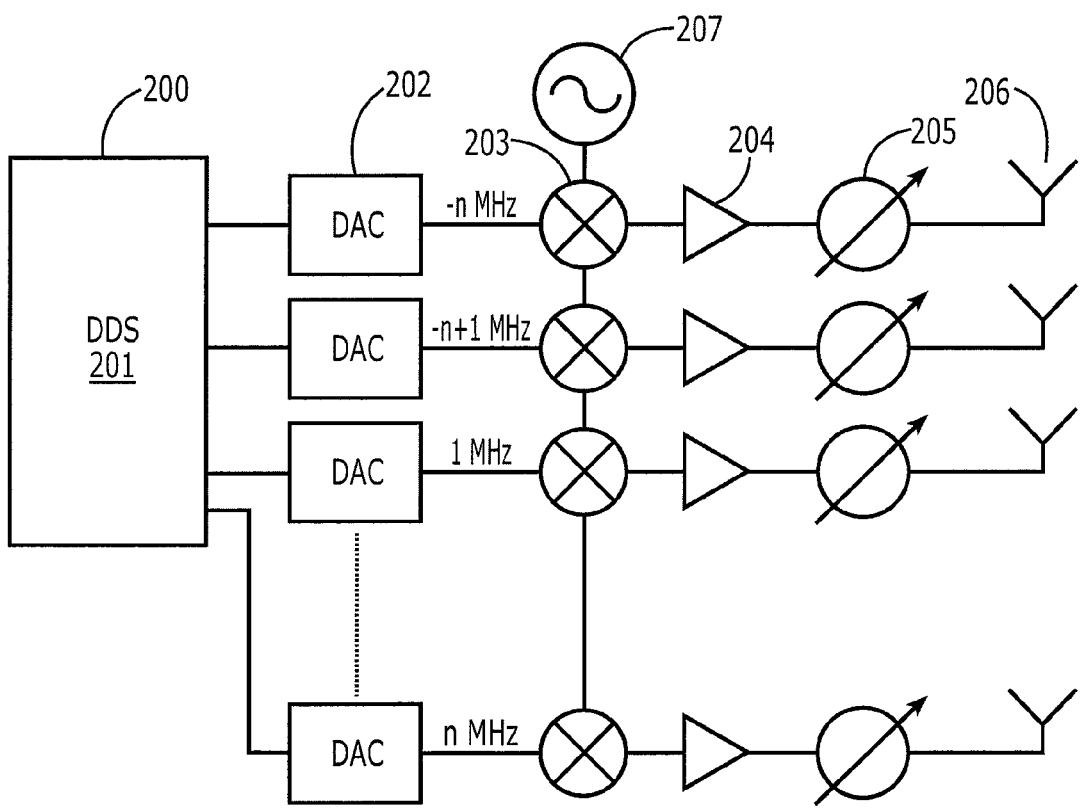
FIG. 2 is a circuit diagram illustrating an integrated amplifier and transmission circuit according to principles of the present invention.

Each of these steps is considered in greater detail below with reference to the integrated amplifier 200 shown schematically in FIG. 2. It should be understood that the method of the claimed invention is segregated into discrete steps for illustration purposes and that the invention is not in any way limited by this segregation. For example, it is well within the scope of invention for certain steps to be combined or others to be further segregated to form any combination of steps or sub-steps.

Step 101—Generation of Signals

Preferably, in step 101, a multi-frequency signal is generated as a composition of discrete tones, each tone being a constant envelope modulated signal. Specifically, individual tones are generated and modulated using digital signal processing. This process can be carried out by a wave generator, or more specifically, by a direct digital synthesizer (DDS) 201 which is known in the art. In a preferred embodiment, each generated tone is modulated using a constant envelope modulation scheme, such as frequency shifting or phase shift keying.

Each modulated tone is then processed in one of a bank of separate digital to analogue converters (DAC) 202. Here, each DAC converts a digitally represented sampled waveform code to an analog signal that is either constant envelope or has very small peak to average power ratio for further processing. Once converted, the signals are passed to a bank of parallel single sideband mixers 203 driven by a frequency oscillator 207. Here, the signals are upconverted to an appropriate transmission frequency band. The tones themselves are offset in frequency by an appropriate frequency separation as required by the signal being transmitted. Preferably, the modulated tones are orthogonal to facilitate digital frequency demultiplexing (e.g. filtering based on Discrete Fourier Transforms). Utilizing current hardware technology, it is reasonable to generate a dozen such tones separated by at least 1 MHz.

After upconversion by the mixers, each tone is then sent to a power amplifier 204 that operates at or near its saturation level. With present CMOS technology, 100 mW power is a realistic output power for each amplifier, with a combined transmit power well over 1 W. This level of operation is much more efficient than known prior art as the present invention utilizes fully saturated amplifiers operating at a much higher level of efficiency.

Step 102—Transmission of Signals

After amplification, the tones are passed to a reactive circuit 205 that is preferably an on-chip circuit. This reactive circuit 205 is used to match an antenna to a specific amplifier. The matching circuit is tuned to one of several widely differing carrier frequencies by switching a bank of capacitors or inductors. With this wideband tuning, carrier frequencies in the range of 900 MHz to 6000 MHz are achievable for broadcasting each tone. The purpose of the tuning elements is to allow the antennas to operate with high efficiency operation (e.g., with very high return loss) across the fully available spectrum. These matching circuits 205, or tuners as they are used in this case, are especially important for hand-held wireless devices where any signal radiating element will have to be very small and therefore inherently narrow band if to operate efficiently. The present invention will facilitate the transmission through the antennas with little reflectivity as each antenna will see only a narrowband part of the composite wideband signal at any given time.

Now, each individually generated, processed and amplified tone is transmitted through an antenna 206. There can be a varying amount of antennas 206 based upon the system design, but at the least there must be one antenna for each individual tone being transmitted. In one exemplary embodiment of the present invention, two antennas are used to broadcast two individual tones at separate frequencies. In another embodiment, four antennas are used to transmit four individual tones, each antenna transmitting at a separate frequency. As mentioned above, preferably, the modulated tones are orthogonal. By transmitting different frequencies using separate antennas with their proper matching, the tones are radiated without mutual interaction in the air. Essentially, this means that the tones are broadcast simultaneously over the same medium (i.e., the air), but due to having different frequencies and/or having orthogonal modulations, the tones can be ideally separated at the receiver without tone-to-tone intersymbol interference. This differs from known prior art where all tones, as in OFDM, are radiated with the same carrier frequency through a single power amplifier. Another known fault in the prior art is the power when utilizing a single amplifier has to be reduced to avoid tone-to-tone intersymbol interference caused by the nonlinear distortion of the amplifier.

Step 103—MIMO operation

In conventional OFDM, the information sequence is broken into several streams of symbols independently modulated into several subcarriers (e.g., tones) that are placed on a common RF carrier and amplified in a single power amplifier for transmission through a single antenna. OFDM is a very natural signaling method for MIMO (multiple input multiple output) operation. In MIMO operation, the modulated subcarriers are grouped together and each group is transmitted on the same carrier frequency through a power amplifier and an antenna. These groups are all similar OFDM signals and are related to each other through their digital coding employed in the information encoder. In the conventional MIMO method, therefore, the transmitters all transmit groups of modulated tones. To apply the present invention for MIMO operation, a transmitter needs to transmit a single tone at any given time through a bank of individual amplifiers. This is achieved by permitting the tones in time through the amplifier bank. By the end of transmission all the tones will have been transmitted through all amplifiers and antennas. In this way, MIMO operation is across both frequency and across time segments.

Figure 3:
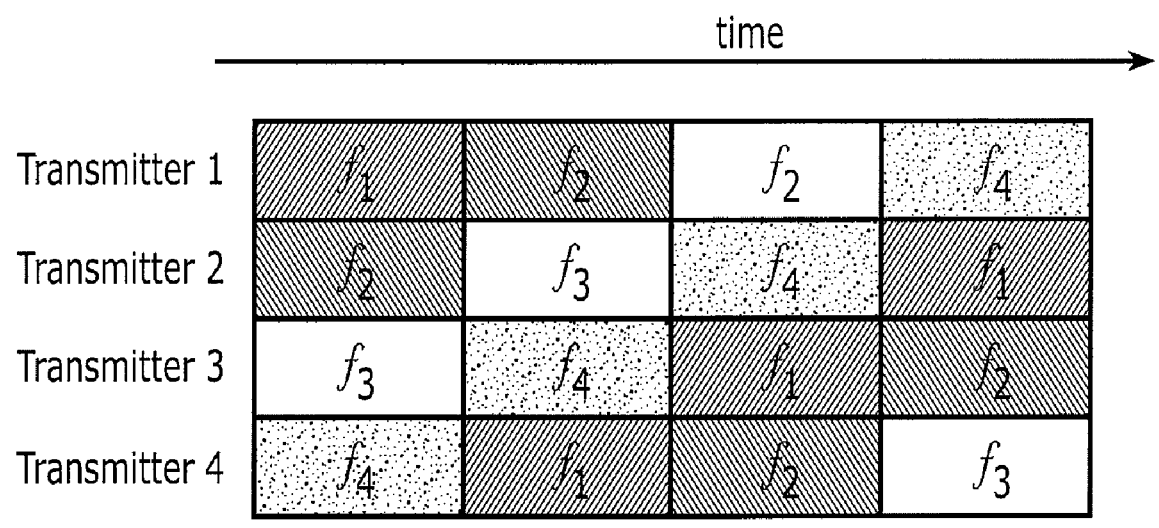
FIG. 3 is a timing diagram illustrating the functionality of multiple transmitters according to principles of the present invention.

FIG. 3 shows an example process with four carrier frequencies to transmit over (e.g., $f_1$, $f_2$, $f_3$, and $f_4$) over four separate amplifiers and antennas. In this situation, tone 1 is transmitted over antenna 1 at $f_1$ and tone 2 is transmitted over antenna 2 at $f_2$, etc. The changes occur in the next transmission steps. In the second transmission step, tone 1 is transmitted over antenna 4 at $f_1$ and tone 2 is transmitted over antenna 1 at $f_2$, etc. A third transmission step involves tone 1 being transmitted over antenna 3 at $f_1$ and tone 2 being transmitted over antenna 4 at $f_2$, etc. A fourth transmission step involves tone 1 being transmitted over antenna 2 at $f_1$ and tone 2 being transmitted over antenna 3 at $f_2$ etc. The antennas are denoted by $A_1$, $A_2$, $A_3$, $A_4$ and the time intervals $t_1$, $t_2$, $t_3$, $t_4$, and let $A_1(t_k)$ denote the frequency of the tone at time $t_k$ through antenna $A_1$. Then as described above $f_1=A_1(t_1)$, $f_2=A_2(t_1)$, $f_3=A_3(t_1)$, $f_4=A_4(t_1)$, $f_2=A_1(t_2)$, $f_3=A_2(t_2)$, $f_4=A_3(t_2)$, $f_1=A_4(t_2)$, $f_3=A_1(t_3)$, $f_4=A_2(t_3)$, $f_1=A_3(t_3)$, $f_2=A_4(t_3)$, $f_4=A_1(t_4)$, $f_1=A_2(t_4)$, $f_2=A_3(t_4)$, $f_3=A_4(t_4)$. There could be other non-cyclic permutations the only restriction being that for MIMO operation all signals (at all frequencies) should go through every one of the antennas at least once.

Demodulation as a four-tone signal is no different from any other multi-tone demodulation scheme but when used as MIMO, modification of the "conventional" MIMO processing is necessary. Notice that across the time dimension at instants t1, t2, t3, and t4, the transmissions $f_1=A_1(t_1)$, $f_1=A_4(t_2)$, $f_1=A_3(t_3)$, $f_1=A_2(t_4)$ occur on the same carrier frequency but over all the transmitters one after the other. (Similarly, the same f2 carrier frequencies are used for these transmission $f_2=A_2(t_1)$, $f_2=A_1(t_2)$, $f_2=A_4(t_3)$, $f_2=A_3(t_4)$.) The receiver, therefore, can process these four transmissions corresponding to the same carrier frequencies as in any other conventional MIMO signal processing with the advantage of their being always constant envelope, hence higher transmit power and of lower or no distortion for the same amplifier. This is illustrated in FIG. 3 that shows the time evolution of the four-tone signal transmitted through four saturated power amplifiers. Each transmitter transmits a fully saturated waveform on one of each carrier frequency $f_1$, $f_2$, $f_3$, $f_4$. The picture shows a particular sequence of tone permutations but others are also possible. Here, four modulated tones are digitally generated at IF carrier frequencies v1, v2, v3, v4. Those tones are upconverted in the single sideband mixer 203 driven by a local oscillator 207 (see FIG. 2) and transmitted at the sum (or difference) frequencies $f_1=f_0+v_1$, $f_2=f_0-v_2$, . . . .

Of course, there could be more tones than four as long as there is one separate transmitter (power amplifier and antenna) for each tone being transmitted. If there are more tones than transmitters it will take proportionally longer to cycle through the frequencies but if the channel coherence time is longer than this cycle time MIMO operation can proceed.

Through these transmission steps, each modulated tone is sent at each frequency for a predetermined period of time as before. These steps result in a total transmission time equal to the number of carrier frequencies being used multiplied by the time period of each transmission. As an example, if $t_c$=100 μs, and there are four transmitters then the total MIMO transmission time is 400 μs. Due to this extended transmission period, the present invention needs a transmission channel coherence window equal to or greater than the total transmission cycle time.

The carrier frequencies are permuted periodically or some randomized manner. Randomization may be preferred in military application to improve the covertness of the signal. Each differently shaded block on FIG. 3 represents a segment of constant envelope modulated waveform whose horizontal length corresponds to the time extent of that particular segment. This way, a four-tone signal is formed from constant envelope waveforms. If the modulations are orthogonal to each other for the particular tone spacing, then it is four-tone OFDM.

The envelope of the resulting composite waveform of the several tones is, of course, widely fluctuating as much as that of any conventional multi-tone signal, but the composite is formed in the air after radiation and after any power amplification. This as mentioned above, facilitates high efficiency amplification with low or no distortion.

MIMO processing can now be applied providing that it is recognized that under constant channel conditions, there is, as in the example illustrated in FIG. 3, a four-tone signal along the time (horizontal) axis for each transmitter. Constant channel condition here is to be understood relative to the channel's coherence time in which communications is to take place.

To simply coherent receive processing, it would be beneficial to fix the carrier frequency of synthesizer and not switch it but only permute the digitally generated frequencies. This way signals emitted are assured to be fully coherent from segment to segment.

It should be understood that this approach is restricted by the channel coherence time. For example, in the embodiment described above, it needs to be at least four times longer than in normal MIMO processing. On the positive side, the power amplifiers used in this approach require at least 6 to 10 dB less peak power than in conventional OFDM or multi-tone system. In fact, if 1 W peak were needed in a comparable conventional OFDM, the transmission can be performed using CMOS technology. The transmitter is preferably a single CMOS or BiCMOS integrated circuit chip, although other semiconductor technologies are possible.

Depending on the coherence bandwidth four channels may be adequate, and for a slow moving transmitter, say a pedestrian, the coherence time may also be quite long, in which case this scheme is available and could be used without any hardware change to the existing four-transmitter OFDM MIMO radio.

By following the pattern presented above, the present invention can be modified to accommodate various numbers of tones, antennas, and carrier frequencies.

What is claimed is:

1. A method of transmitting a multi-tone signal over a multiple input multiple output (MIMO) system having two or more transmitting antennas over several time segments, said method comprising:
    generating first and second signals having different frequencies;
    during a first time segment, transmitting said first signal on a first antenna and said second signal on a second antenna for a predetermined time period; and
    during a second time segment transmitting said second signal on said first antenna and said first signal on said second antenna for said predetermined time period.

2. The method of claim 1 wherein said generating step comprises generating third and fourth signals each having a different frequency and wherein said transmission time segments comprise:
    a second time segment in which said second and said third signals are transmitted on said first and second antenna respectively;
    a third time segment in which said third and said fourth signals are transmitted on said first and second antenna respectively; and
    a fourth time segment in which said fourth and said first signals are transmitted on said first and second antenna respectively.

3. The method of claim 1, wherein said transmitting comprises amplifying said first and second signals using a pair of fully-saturated amplifiers.

4. The method of claim 3, wherein said first and second signals are constant envelope signals.

5. The method of claim 4, wherein said signals are multiplexed in space after being transmitted.

6. The method of claim 5, wherein a coherence window of a wireless channel being used for transmitting said signals is at least as long as said predetermined time period times a total number of transmitting antennas over which the signals are transmitted.

7. The method of claim 1 wherein the first and second signals comprise the same payload.

8. A method of transmitting a multi-tone signal over a MIMO system having two or more transmitting antennas, said method comprising:
    generating a plurality of signals having different frequencies, each of the plurality of signals having a payload, wherein the payload of each signal is identical; and
    transmitting individually each of said signals on each of said antennas for a predetermined time period and in a predetermined sequence.

9. The method of claim 8, wherein said predetermined sequence is arranged such that each of said plurality of signals is broadcast at least once over each antenna over a coherence time of the wireless channel.

10. The method of claim 9, wherein said transmitting comprises amplifying said plurality of signals using fully-saturated or nearly saturated amplifiers.

11. The method of claim 10, wherein said plurality of signals are constant or nearly-constant envelope signals.

12. The method of claim 11, wherein said signals are multiplexed after being transmitted.

13. The method of claim 12, wherein a coherence window of a wireless channel being used for transmitting said signals is at least as long as said predetermined time period times the total number of antennas over which the signals are transmitted.

14. An amplifier circuit comprising:

a signal generator for generating tones of constant envelope signals;

an array of upconverters for converting said tones to a transmittable frequency band, one upconverter for each of the modulated tones; and an amplifier for amplifying each converted tone for transmission by an antenna; and a matching circuit to tune each antenna to the modulated tone being transmitted.

15. The amplifier circuit of claim 14, wherein the amplifier circuit is integrated on a chip.

16. The amplifier circuit of claim 14, wherein said amplifier circuit is a single CMOS or BiCMOS integrated circuit chip.

* * * * *